United States Patent
Magara et al.

(10) Patent No.: US 6,747,236 B1
(45) Date of Patent: Jun. 8, 2004

(54) WIRE ELECTRIC DISCHARGE MACHINING APPARATUS

(75) Inventors: Takuji Magara, Tokyo (JP); Hisashi Yamada, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/220,762

(22) PCT Filed: Mar. 6, 2000

(86) PCT No.: PCT/JP00/01323

§ 371 (c)(1),
(2), (4) Date: Sep. 5, 2002

(87) PCT Pub. No.: WO01/66293

PCT Pub. Date: Sep. 13, 2001

(51) Int. Cl.[7] .................................................. B23H 7/10
(52) U.S. Cl. .................................................. 219/69.12
(58) Field of Search ........................ 219/69.12; 242/128, 242/413.5, 414.1, 417, 421, 154, 156, 593

(56) References Cited

U.S. PATENT DOCUMENTS

| 1,920,962 | A | * | 8/1933 | Arkema | |
| 3,144,544 | A | * | 8/1964 | Kurtz | 219/130 |
| 3,868,069 | A | * | 2/1975 | Schulz | 242/128 |
| 4,530,471 | A | * | 7/1985 | Inoue | |
| 4,687,151 | A | * | 8/1987 | Memminger et al. | 242/128 |
| 5,753,879 | A | * | 5/1998 | Yang et al. | 219/69.12 |
| 6,045,023 | A | * | 4/2000 | Michard | 219/69.12 |

FOREIGN PATENT DOCUMENTS

| JP | 62-124825 A | * | 6/1987 |
| JP | 62-157726 | | 7/1987 |
| JP | 62-157726 A | | 7/1987 |
| JP | 63-2630 A | | 1/1988 |
| JP | 63-2630 | | 1/1988 |
| JP | 01-222821 A | * | 2/1989 |
| JP | 01-125126 U | * | 8/1989 |
| JP | 2-46326 | | 10/1990 |
| JP | 2-46326 A | | 10/1990 |
| WO | WO-95/13895 A1 | * | 5/1995 |

* cited by examiner

*Primary Examiner*—Geoffrey S. Evans
(74) *Attorney, Agent, or Firm*—Sughrue Mion, PLLC

(57) ABSTRACT

A wire electrical discharge machine includes a wire bobbin 3 with a wire electrode 1 wound therearound; a fixing base 25 for fixing the wire bobbin 3 so that the wire bobbin 3 does not rotate; a guide pulley 23 for supporting the wire electrode 1; a rotating arm 21 for supporting the guide pulley 23 and for pulling out the wire electrode 1 from the wire bobbin 3 and rotating the wire electrode 1 about the wire bobbin 3; a sliding mechanism 24 for supporting the guide pulley 23 slidably with respect to the rotating arm 21, in correspondence with a winding position of the wire electrode 1 on the wire bobbin 3; and a braking motor 13 for driving the rotating arm 21. It is possible to disperse the wear of the wire electrode 1 and improve the machining rate and machining accuracy. Further, it is possible to improve the reliability and suppress an increase in cost.

7 Claims, 9 Drawing Sheets

WIRE ELECTRIC DISCHARGE MACHINING APPARATUS

This Application is a 371 of PCT/JP00/01323, filed Mar. 6, 2000.

TECHNICAL FIELD

The present invention relates to improvements in a wire electrical discharge machine for machining a workpiece by electric discharge energy by supplying machining electric power between a wire electrode and the workpiece.

BACKGROUND ART

FIG. 8 is a schematic diagram illustrating a conventional wire electrical discharge machine, in which reference numeral 1 denotes a wire electrode; 2, a workpiece, 3, a wire bobbin; 4, a main tension pulley for imparting tension to the wire electrode 1; and 5, a braking motor for causing the main tension pulley to produce torque. Numerals 6a and 6b denote wire guides respectively provided above and below the workpiece 2; 7a and 7b, working fluid nozzles respectively provided above and below the workpiece 2, and 8a and 8b, feeders for supplying machining electric power to the wire electrode 1. Numeral 9 denotes a power supply unit for machining; 10, a wire-electrode-traveling roller; 11, a wire-electrode-traveling motor; 12, a wire-electrode collection box; and 13, a braking motor for pretensioning for causing the wire bobbin to generate torque. Numerals 14a, 14b, and 14c denote guide pulleys. In addition, arrow A in the drawing indicates the traveling direction of the wire electrode 1.

In such a conventional wire electrical discharge machine, as the wire-electrode-traveling roller 10 is driven-by the wire-electrode-traveling motor 11, the wire electrode 1 is pulled out from the wire bobbin 3. In the main tension pulley 4 and the wire bobbin 3, predetermined tensions are applied to the wire electrode 1 by the braking motors 5 and 13. In the state in which these predetermined tensions are applied, the wire electrode 1 travels in the direction of arrow A in the drawing while maintaining a predetermined speed. The wire bobbin 3 rotates about a wire bobbin shaft as the wire electrode 1 travels. The wire electrode 1 is wound around the wire bobbin 3, and is continuously pulled out from the wire bobbin 3. In conjunction with the traveling of the wire electrode 1, machining electric power is supplied to the gap between the wire electrode 1 and the workpiece 2 from the machining power supply unit 9 through the feeders 8a and 8b, and a working fluid is supplied to the gap through the working fluid nozzles 7a and 7b, with the result that electric discharge occurs. As the wire electrode 1 and the workpiece 2 are relatively moved in a predetermined machining direction by an unillustrated drive mechanism, the machining of the workpiece 2 progresses.

In such wire electrical discharge machining, a substantial portion of the wire electrode 1 facing the machining direction is worn due to the discharge. Accordingly, since the frequency of disconnection of the wire electrode 1 increases, there has been a problem in that the machining rate declines appreciably.

In addition, the wear of the wire electrode 1 has a large effect on the machining accuracy as well. Namely, since the wear of the wire electrode 1 progresses while the wire electrode 1 is traveling from an upper portion to a lower portion of the workpiece 2, there has been a problem in that taper-like errors occur on the machined surface of the workpiece 2 with respect to the traveling direction of the wire electrode 1. Such taper-like errors become noticeable particularly in cases where the thickness of the workpiece 2 is large.

FIG. 9 is a partial cross-sectional view illustrating a wire-electrode loading mechanism in a wire electrical discharge machine disclosed in JP-A-63-2630 for the purpose of resolving the problems of the above-described conventional art. In the drawing, reference numeral 1 denotes the wire electrode; 3, a wire bobbin; and 14a, a guide pulley. Numerals 15a and 15b denote bearings, and numeral 16 denotes a rotating jig; 17, a bearing; 18, a rotating motor; 18a, an output shaft of the rotating motor 18; and 19, a fixing base. The wire bobbin 3 is supported by the rotating jig 16 by means of the bearings 15a and 15b so as to be rotatable about a β axis in the drawing. Further, the rotating jig 16 is connected to the output shaft 18a of the rotating motor 18.

The overall construction of the wire electrical discharge machine having the wire-electrode loading mechanism having the arrangement shown in FIG. 9 is similar to that shown in FIG. 8, and corresponds to an arrangement in which the wire bobbin 3, the braking motor 13, and the like in FIG. 8 are replaced by FIG. 9. It should be noted, however, that a motor corresponding to the braking motor 13 shown in FIG. 8 is not present in FIG. 9. Accordingly, in order to be provided with functions utterly identical to those of the overall construction shown in FIG. 8, it is necessary to add the braking motor 13 to, for example, the β axis shown in FIG. 9.

In FIG. 9, if the wire electrode 1 travels (in the direction of arrow A in the drawing), the wire bobbin 3 rotates about the β axis (in the direction of arrow B in the drawing), and the wire electrode 1 wound around the wire bobbin 3 is pulled out from the wire bobbin 3. In conjunction with the traveling of this wire electrode 1, the wire bobbin 3 is rotated about an α axis (in the direction of arrow C in the drawing) by the rotating motor 18 to impart rotation to the wire electrode 1, thereby making it possible to disperse the wear of the wire electrode 1 at the time of wire electrical discharge machining. Therefore, there is an advantage, among others, in that the machining accuracy of the workpiece can be improved.

In the arrangement of the wire-electrode loading mechanism such as the one shown in FIG. 9, the rotating motor 18 used exclusively for imparting rotation to the wire electrode 1 is required in addition to the braking motor (e.g., 13 in FIG. 8) for applying tension to the wire electrode 1. In addition, since there is a need to rotate the entire wire bobbin 3 about the α axis, the load inertia of the rotating motor 18 is large, so that the rated output of the rotating motor 18 and the capacity of the allowable rated load and the like of machine elements such as the bearing 17 are required to be large. Hence, there has been a problem in that an increase in cost is large, and this arrangement is not practical.

DISCLOSURE OF THE INVENTION

The present invention has been devised to overcome the above-described problems, and its object is to obtain a wire electrical discharge machine which makes it possible to disperse the wear of the wire electrode and improve the machining rate and machining accuracy.

Another object is to obtain a wire electrical discharge machine which makes it possible to suppress an increase in cost without requiring the provision of a new motor for imparting rotation to the wire electrode, and which is highly reliable and is practical.

The wire electrical discharge machine in accordance with the invention is a wire electrical discharge machine for machining a workpiece by electric discharge energy by causing discharge to occur between a traveling wire electrode and the workpiece, comprising: a wire bobbin with the wire electrode wound therearound; fixing means for fixing the wire bobbin so that the wire bobbin does not rotate; guiding means for supporting the wire electrode; wire-electrode rotating means for supporting the guiding means and for pulling out the wire electrode from the wire bobbin and rotating the wire electrode about the wire bobbin; and driving means for driving the wire-electrode rotating means.

In addition, in the wire electrical discharge machine in accordance with the invention, the driving means is a braking motor for imparting predetermined tension to the wire electrode.

In addition, in the wire electrical discharge machine in accordance with the invention comprises: sliding means for supporting the guiding means slidably with respect to the wire-electrode rotating means, in correspondence with a winding position of the wire electrode on the wire bobbin.

In addition, the wire electrical discharge machine in accordance with the invention is a wire electrical discharge machine wire electrical discharge machine for machining a workpiece by electric discharge energy by causing discharge to occur between a traveling wire electrode and the workpiece, comprising: a wire bobbin around which the wire electrode is wound in advance with in a state in which rotation in a twisting direction is continuously imparted to the wire electrode, and which is supported in such a manner as to be rotatable in a direction in which the wire electrode is pulled out.

Since the wire electrical discharge machine in accordance with the invention is constructed as described above, the following advantages are offered.

The wire electrical discharge machine in accordance with the invention is capable of dispersing the wear of the wire electrode and improving the machining rate and machining accuracy.

In addition, the wire electrical discharge machine in accordance with the invention is capable of improving the reliability.

In addition, the wire electrical discharge machine in accordance with the invention is capable of suppressing an increase in cost.

BEST MODE FOR CARRYING OUT THE INVENTION

First Embodiment

Figure 1:
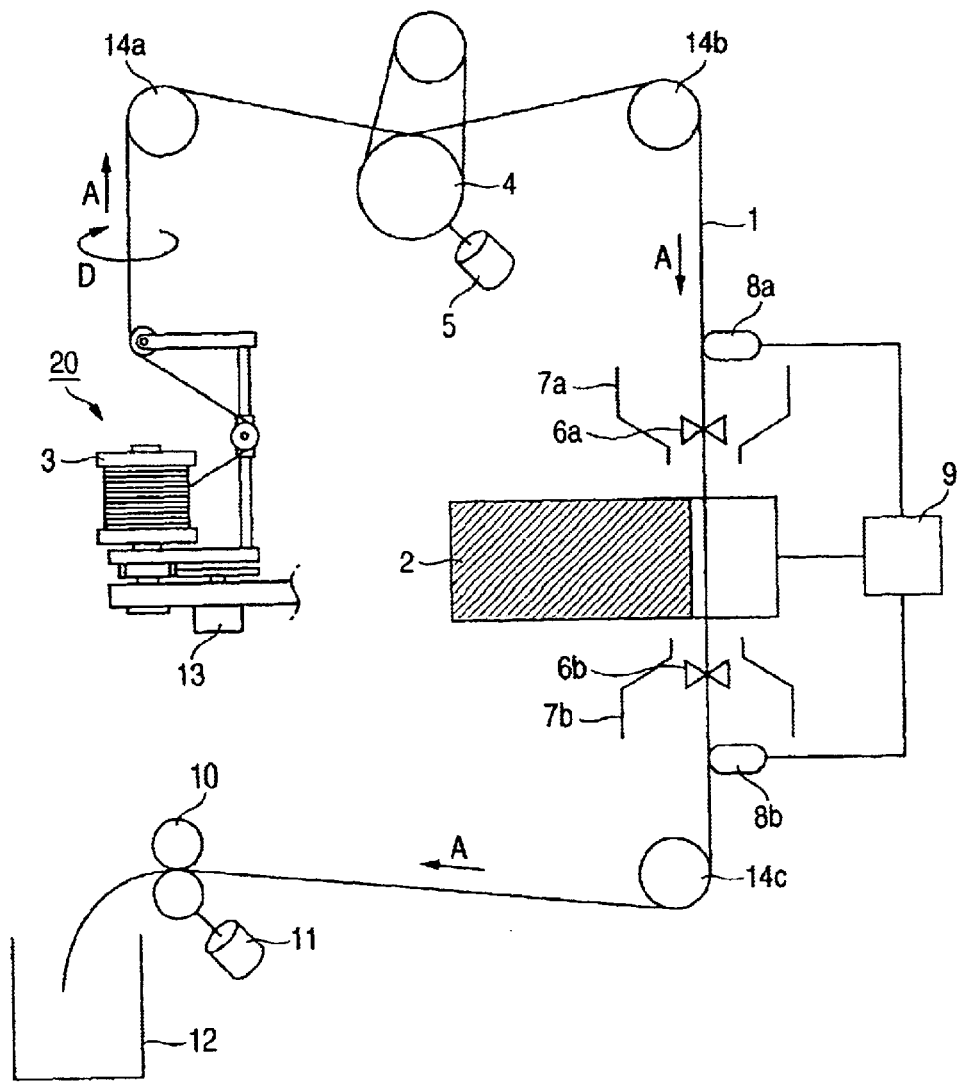
FIG. 1 is a schematic diagram illustrating a wire electrical discharge machine in accordance with a first embodiment of the invention.

FIG. 1 is a schematic diagram illustrating a wire electrical discharge machine in accordance with a first embodiment of the invention, in which reference numeral 1 denotes a wire electrode; 2, a workpiece; 3, a wire bobbin; 4, a main tension pulley for imparting tension to the wire electrode 1; and 5, a braking motor for causing the main tension pulley to produce torque. Numerals 6a and 6b denote wire guides respectively provided above and below the workpiece 2; 7a and 7b, working fluid nozzles respectively provided above and below the workpiece 2, and 8a and 8b, feeders for supplying machining electric power to the wire electrode 1. Numeral 9 denotes a power supply unit for machining; 10, a wire-electrode-traveling roller; 11, a wire-electrode-traveling motor; 12, a wire-electrode collection box; and 13, a braking motor for pretensioning for applying torque to the wire bobbin 3. Numerals 14a, 14b, and 14c denote guide pulleys, and numeral 20 denotes a wire-electrode loading mechanism. In addition, arrow A in the drawing indicates the traveling direction of the wire electrode 1.

As the wire-electrode-traveling roller 10 is driven, the wire electrode 1 is pulled out from the wire bobbin 3 in the direction of arrow A in the drawing to effect the traveling of the wire electrode 1. The wire electrode 1 is supplied in a state in which the wire bobbin 3 is not rotated and in a state in which rotation in a twisting direction (in the direction of arrow D in the drawing) is imparted to the axial center of the wire electrode from the wire-electrode loading mechanism 20. In conjunction with the traveling of the wire electrode 1, machining electric power is supplied to the gap between the wire electrode 1 and the workpiece 2 from the machining power supply unit 9 through the feeders 8a and 8b, and a working fluid is supplied to the gap through the working fluid nozzles 7a and 7b, with the result that electric discharge occurs. As the wire electrode 1 and the workpiece 2 are relatively moved in a predetermined machining direction by an unillustrated drive mechanism, the machining of the workpiece 2 progresses.

Figure 2:
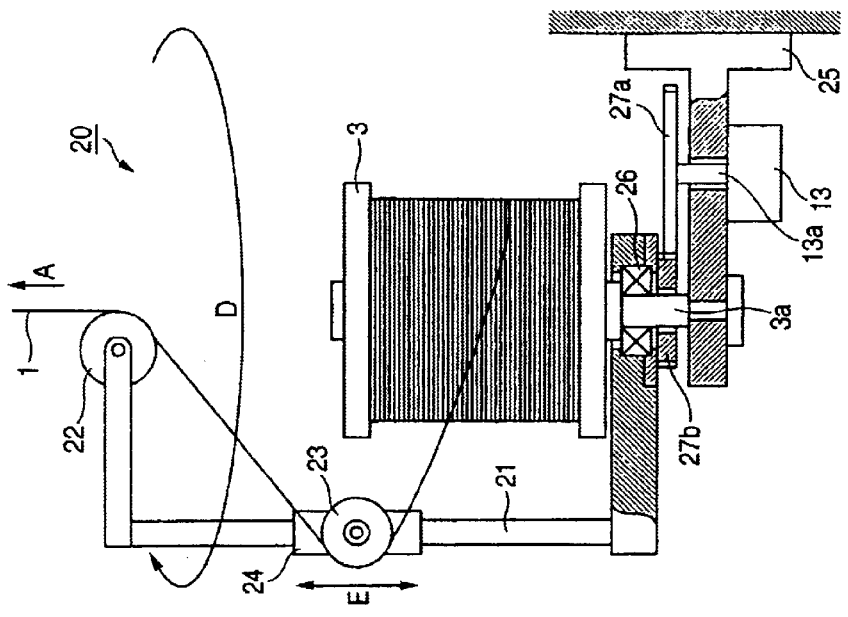
FIGS. 2(a) and 2(b) are partial cross sectional views illustrating a wire-electrode loading mechanism of the wire electrical discharge machine in accordance with the first embodiment of the invention.
Figure 2:
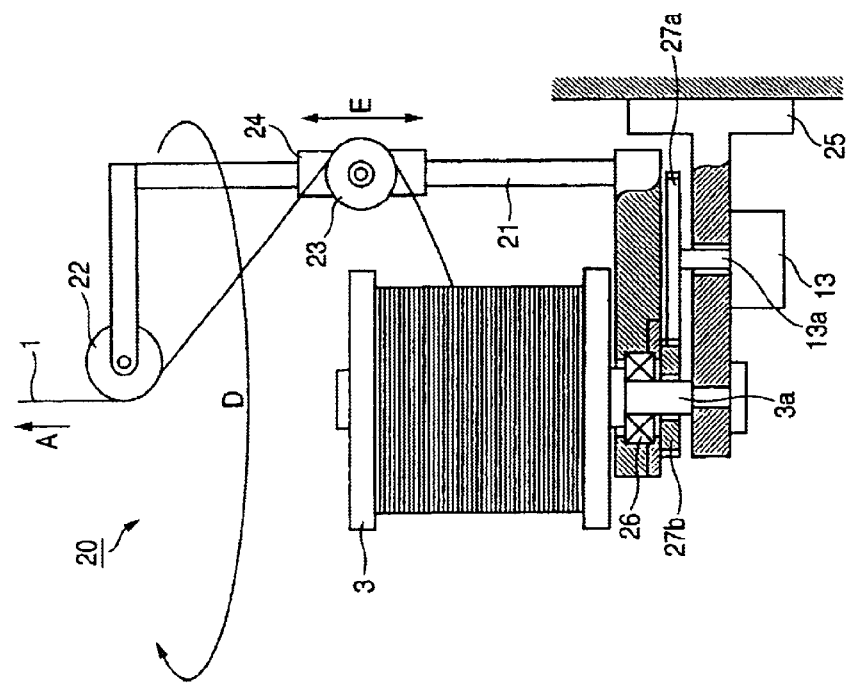

FIG. 2 shows the details of the structure of the wire-electrode loading mechanism 20, in which reference numeral 1 denotes the wire electrode; 3, the wire bobbin; 3a, a wire bobbin shaft fixed to or formed integrally with the wire bobbin 3; 13, the braking motor for pretensioning; 13a, an output shaft of the braking motor 13; and 21, a rotating arm, i.e., a wire-electrode rotating means which is supported rotatably about the wire bobbin 3 (in the direction of arrow D in the drawing) and rotates about the wire bobbin 3. Numerals 22 and 23 denote guide pulleys which are supported by the rotating arm 21 and support the wire electrode 1. Numeral 24 denotes a sliding mechanism, i.e., a sliding means for supporting the guide pulley 23 slidably in the longitudinal direction of the rotating arm 20 (in the direction of arrow E in the drawing); 25, a fixing base, i.e., a fixing means for fixing the wire bobbin 3 so that it does not rotate; and 26, a bearing. Numerals 27a and 27b denote gears. The gear 27b is fixed to the rotating arm 21, and its central portion is hollow. The gears 27a and 27b are for transmitting the output of the braking motor 13 to the rotating arm 21, and another transmitting mechanism such as belt transmission may be used instead of the gears 27a and 27b. In addition, as the sliding mechanism 24, it is possible to use various machine elements such as a linear guide and a ball spline.

The wire bobbin shaft 3a passes through a hollow portion of the gear 27b and is coupled to the fixing base 25. Accordingly, the wire bobbin 3 is arranged so as not to rotate. In addition, the rotating arm 21 is supported by the bearing 26 in such a manner as to be rotatable together with the wire bobbin shaft 3a, and an output of the braking motor 13, which is a driving means for rotating the rotating arm 21, is transmitted to the rotating arm 21 through the output shaft 13a, the gear 27a, and the gear 27b. Accordingly, the rotating arm 21 is rotated about the wire bobbin 3 (in the direction of arrow D in the drawing) by the braking motor 13.

In FIG. 2, the wire electrode 1 is pulled out from the wire bobbin 3 through the guide pulley 23 and the guide pulley 22 (in the direction of arrow A in the drawing). The wire electrode 1 is pulled out continuously as the rotating arm 21 rotates about the wire bobbin 3 (from (a) to (b) in FIG. 2; in the direction of arrow D in the drawing) with the wire bobbin 3 not rotating. In addition, although the position of the wire electrode 1 which is pulled out from the wire bobbin 3 moves in the vertical direction in FIG. 2 (in the direction of arrow E in the drawing) as the wire electrode 1 travels, the wire electrode 1 can be pulled out smoothly and stably without becoming disorderly since the guide pulley 23 is slid in the direction of arrow E in the drawing by the sliding mechanism 24 in correspondence with the winding position of the wire electrode 1 on the wire bobbin 3. Further, since the rotating arm 21 is coupled to the braking motor 13 by means of the gears 27b and 27a, predetermined pretension can be imparted to the wire electrode 1 by this braking motor 13.

The wire electrode 1 supplied by the wire-electrode loading mechanism 20 is supplied to the gap between the wire electrode 1 and the workpiece 2 in a state in which a fixed rotation (twist) per unit length is being applied to the wire electrode 1. Namely, the amount of rotation (twist), $\delta$, per unit length of the wire electrode 1 is given by $\delta=1/(2\pi R)$ (R is the radius of the wire bobbin), while the rotational speed of the wire electrode 1, i.e., the rotational speed of the rotating arm 21, $\omega$, is given by $\omega=F/(2\pi R)$ (F is the traveling speed of the wire electrode). Accordingly, in conjunction with the movement of the wire electrode 1 as it travels from the upper portion to the lower portion of the workpiece 2, machining progresses while the wire electrode 1 rotates. For example, if it is assumed that the thickness of the workpiece 2 is T, the amount of rotation, $\delta t$, of the wire electrode 1 from the upper surface to the lower surface of the workpiece 2 becomes $\delta t=T/(2\pi R)$.

Thus in the case where machining is effected by imparting rotation to the wire electrode 1, since machining is effected by making use of not a portion but an entire periphery of the wire electrode 1, it is possible to disperse the wear of the wire electrode 1. Accordingly, the disconnection frequency of the wire electrode 1 decreases, and the machining rate increases.

Figure 3:
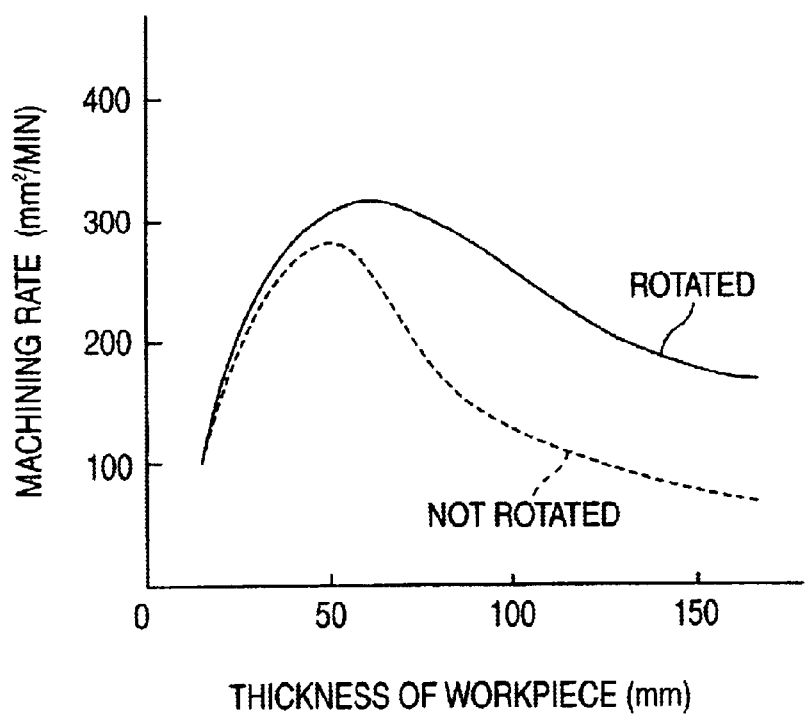
FIG. 3 is a diagram illustrating the change of the machining rate with respect to the thickness of a workpiece.

FIG. 3 shows the change of the machining rate relative to the thickness of the workpiece 2 by comparing the presence and absence of the rotation of the wire electrode 1. It can be appreciated that in the case where rotation is imparted to the wire electrode 1 (solid line), the amount of rotation of the wire electrode, $\delta t$, from the upper surface to the lower surface of the workpiece 2 increases, so that the machining rate particularly improves as compared with the case where the wire electrode 1 is not rotated (broken line).

In addition, since the wear of the electrode can be dispersed over the entire periphery by imparting rotation to the wire electrode 1, it is possible to substantially reduce such as taper-shaped errors ascribable to electrode wear, thereby making it possible to improve the machining accuracy.

In addition, since the wire-electrode loading mechanism 20 for pulling out the wire electrode 1 without rotating the wire bobbin 3 is adopted, it is unnecessary to rotate the entire wire bobbin 3 by a driving unit, so that the moor used exclusively for rotating the wire bobbin 3 is made unnecessary, thereby making it possible to make the drive unit compact. Furthermore, smooth and stable supply of the wire is made possible by the adoption of the sliding mechanism 24, so that it is possible to substantially improve the reliability.

Second Embodiment

Figure 4:
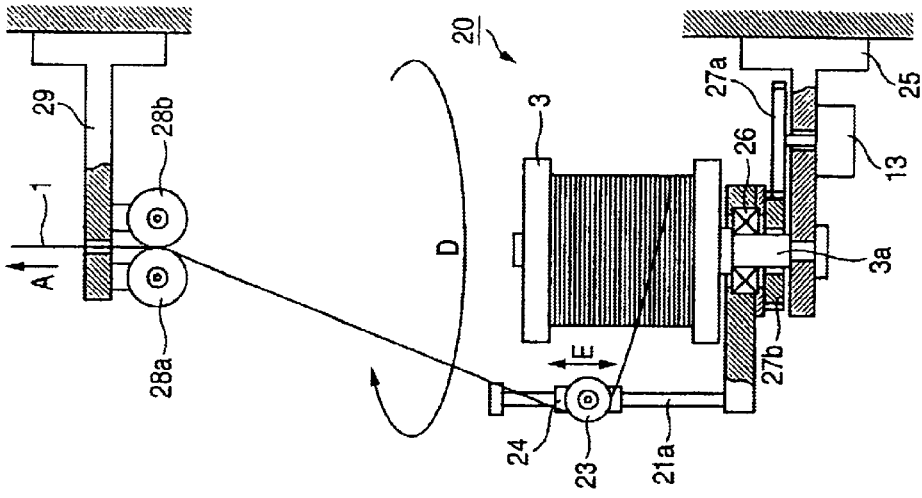
FIGS. 4(a) and 4(b) are partial cross sectional views illustrating a wire-electrode loading mechanism of the wire electrical discharge machine in accordance with a second embodiment of the invention.
Figure 4:
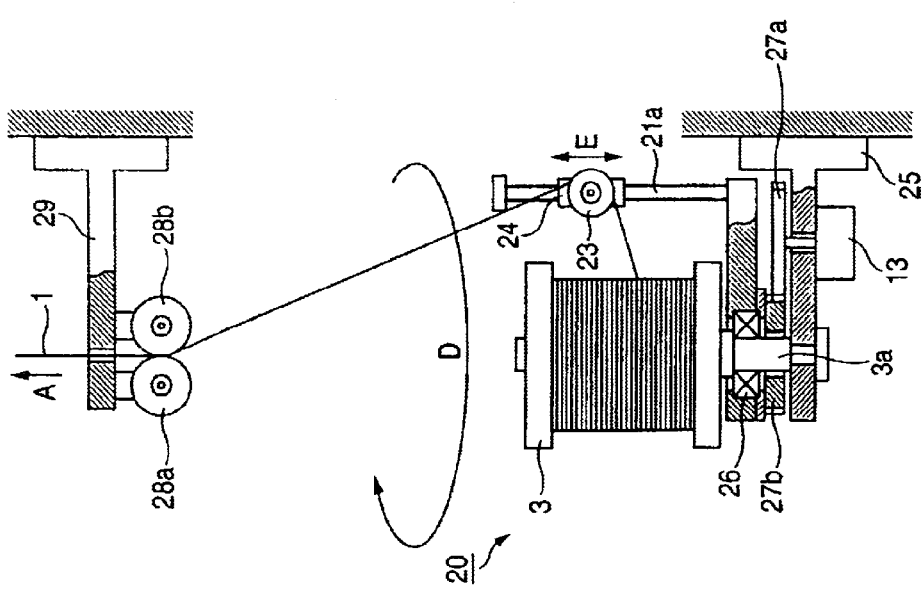

FIG. 4 is a partial cross-sectional view illustrating the wire-electrode loading mechanism 20 of the wire electrical discharge machine in accordance with a second embodiment of the invention, and the same reference numerals as those of the first embodiment shown in FIG. 2 denote identical or corresponding parts. In FIG. 4, reference numeral 21a denotes a rotating arm which is supported so as to be rotatable about the wire bobbin 3 (in the direction of arrow D in the drawing); numerals 28a and 28b denote guide pulleys; and 29 denotes a fixing base. The arrangement of the guide pulley section whereby the wire electrode 1 passes from the wire bobbin 3 through the guide pulley 23 is differs from the arrangement of the first embodiment shown in FIG. 2. While in the arrangement of FIG. 2 the guide pulley 22 is supported by the rotating arm 21, in the arrangement of FIG. 4 the guide pulleys 28a and 28b are independent of the rotating arm 21a. In addition, the arrangement and operation of the wire electrical discharge machine other than the wire-electrode loading mechanism 20 are similar to those of the first embodiment shown in FIG. 1.

Since the wire-electrode loading mechanism 20 having the arrangement shown in FIG. 4 exhibits advantages similar to those of the first embodiment, and since the guide pulleys 28a and 28b are independent of the rotating arm 21a, it is possible to further reduce the load inertia of the braking motor 13 than in the first embodiment. As a result, there is an advantage in that the drive system can be made further compact.

In addition, the arrangement shown in FIG. 4 is suitable particularly for a case in which the wire bobbin 3 and the guide pulley section are to be used by being distanced from each other for the purpose of such as reducing the variation of the pretension.

Figure 5:
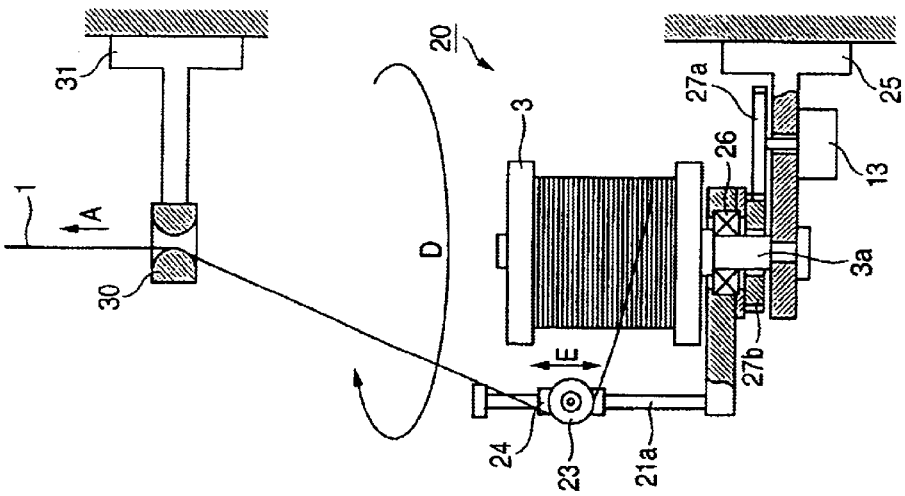
FIGS. 5(a) and 5(b) are partial cross sectional views illustrating another example of the wire-electrode loading mechanism of the wire electrical discharge machine in accordance with a second embodiment of the invention.
Figure 5:
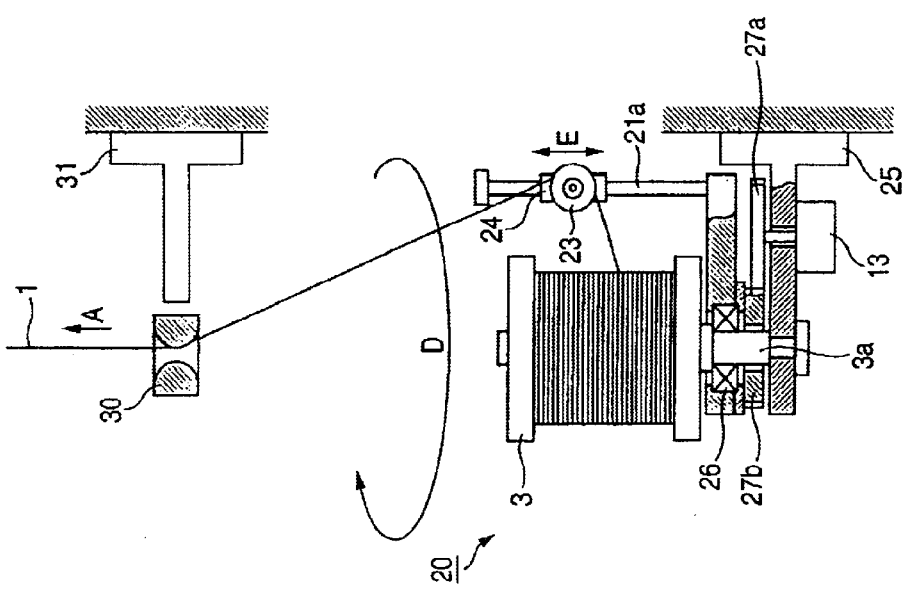

FIG. 5 is a partial cross-sectional view illustrating another example of the wire-electrode loading mechanism 20 of the wire electrical discharge machine in accordance with the second embodiment of the invention, and the same reference numerals as those in FIG. 4 denote identical or corresponding parts. In FIG. 5, reference numeral 30 denotes a wire guide, and 31 denotes a fixing base, and the arrangement provided is such that the guide pulley portion (28a and 28b)

shown in FIG. 4 is replaced by the wire guide 30. The wire-electrode loading mechanism 20 having the arrangement shown in FIG. 5 exhibits advantages similar to those of the arrangement shown in FIG. 4, and is suitable for such as the case of machining by a large-diameter wire electrode for which pretensioning accuracy and the like are not so much required, so that this wire-electrode loading mechanism 20 makes it possible to simplify the mechanism further.

Third Embodiment

Figure 6:
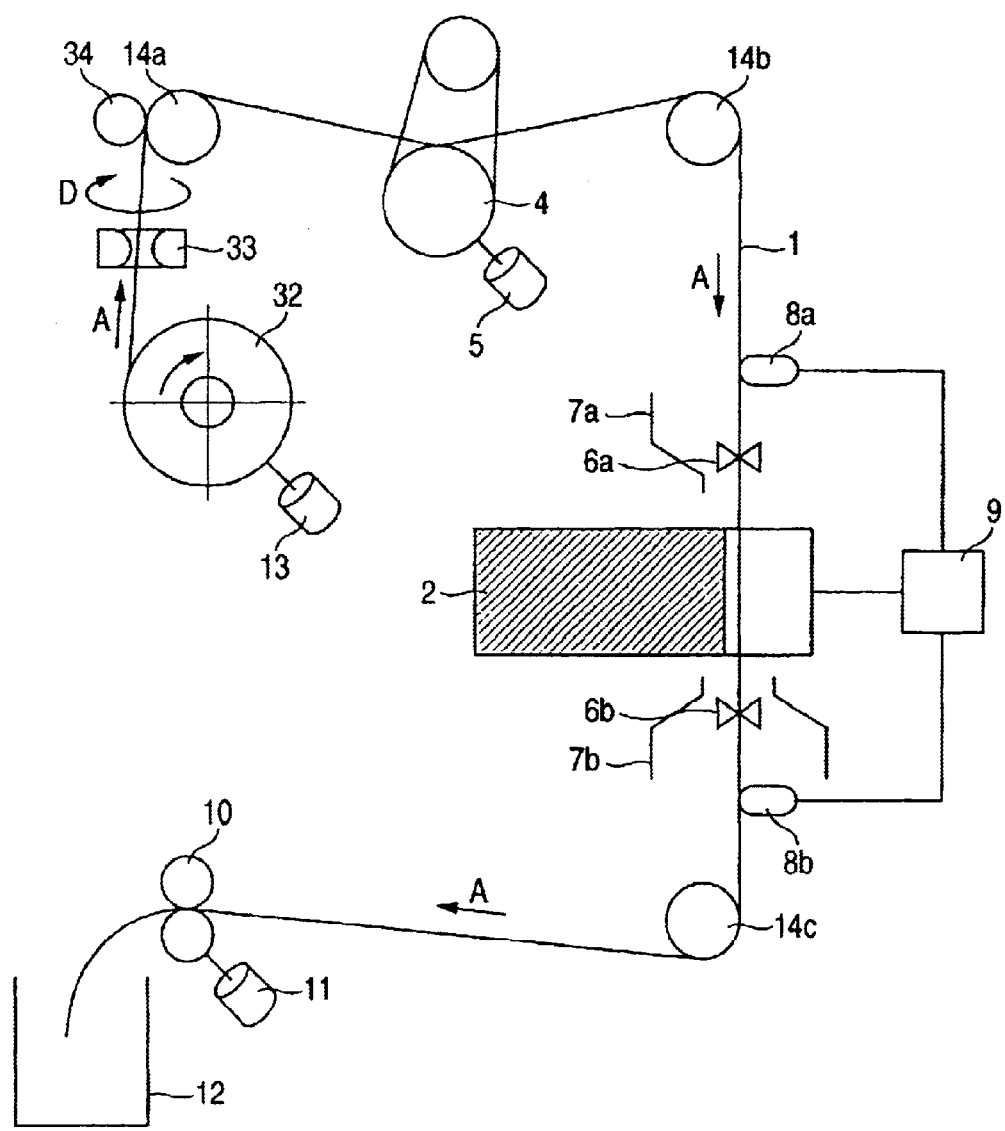
FIG. 6 is a schematic diagram illustrating the wire electrical discharge machine in accordance with a third embodiment of the invention.

FIG. 6 is a schematic diagram illustrating the wire electrical discharge machine in accordance with a third embodiment of the invention, and the same reference numerals as those of the first embodiment shown in FIG. 1 denote identical or corresponding parts. In FIG. 6, reference numeral 32 denotes a wire bobbin with the wire electrode 1 wound in advance therearound in a state in which rotation in the twisting direction has been continuously applied to the wire electrode 1; 33, denotes a wire guide; and 34, a disorderliness-preventing pulley for preventing the wire electrode 1 from becoming disorderly.

Figure 7:
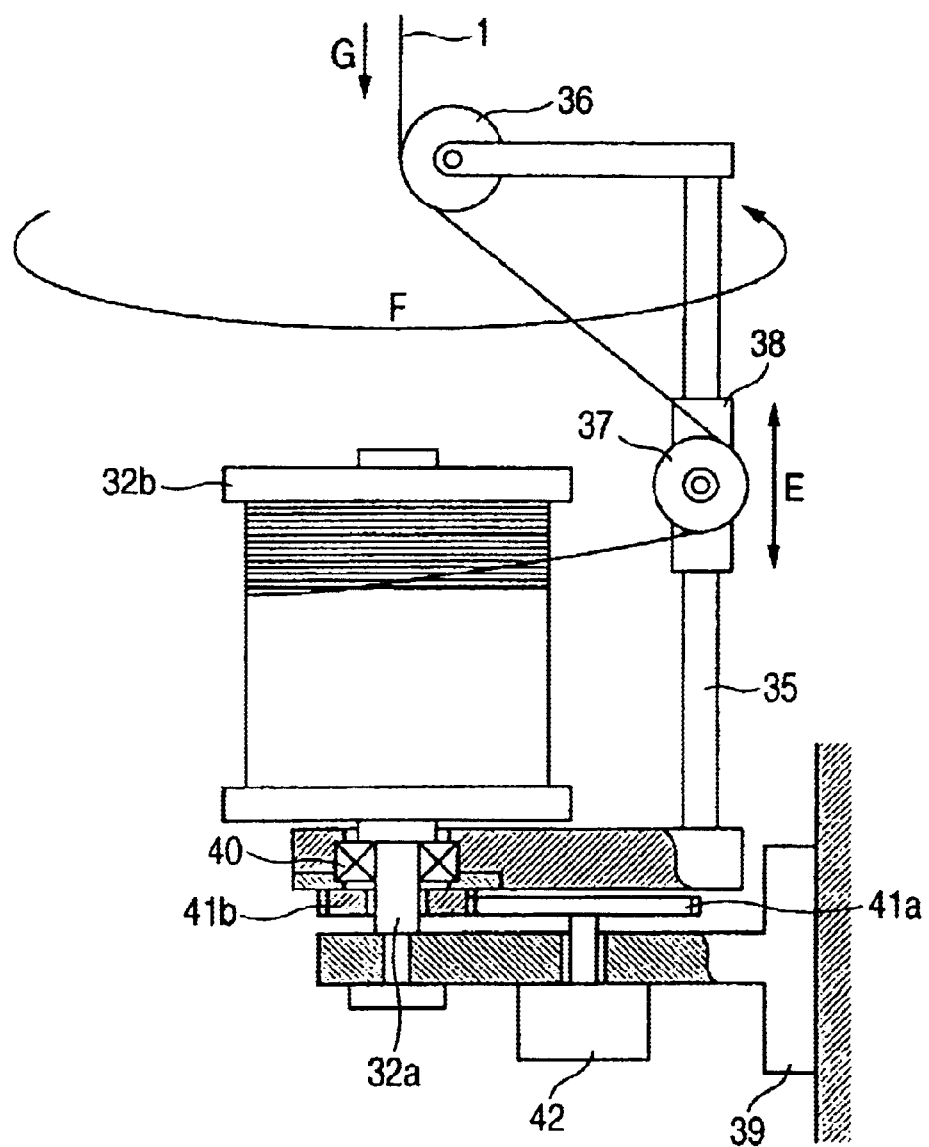
FIG. 7 is a partial cross-sectional view illustrating an example of a device for winding a wire electrode in advance around a wire bobbin while rotation in a twisting direction is being continuously imparted to the wire electrode.
Figure 8:
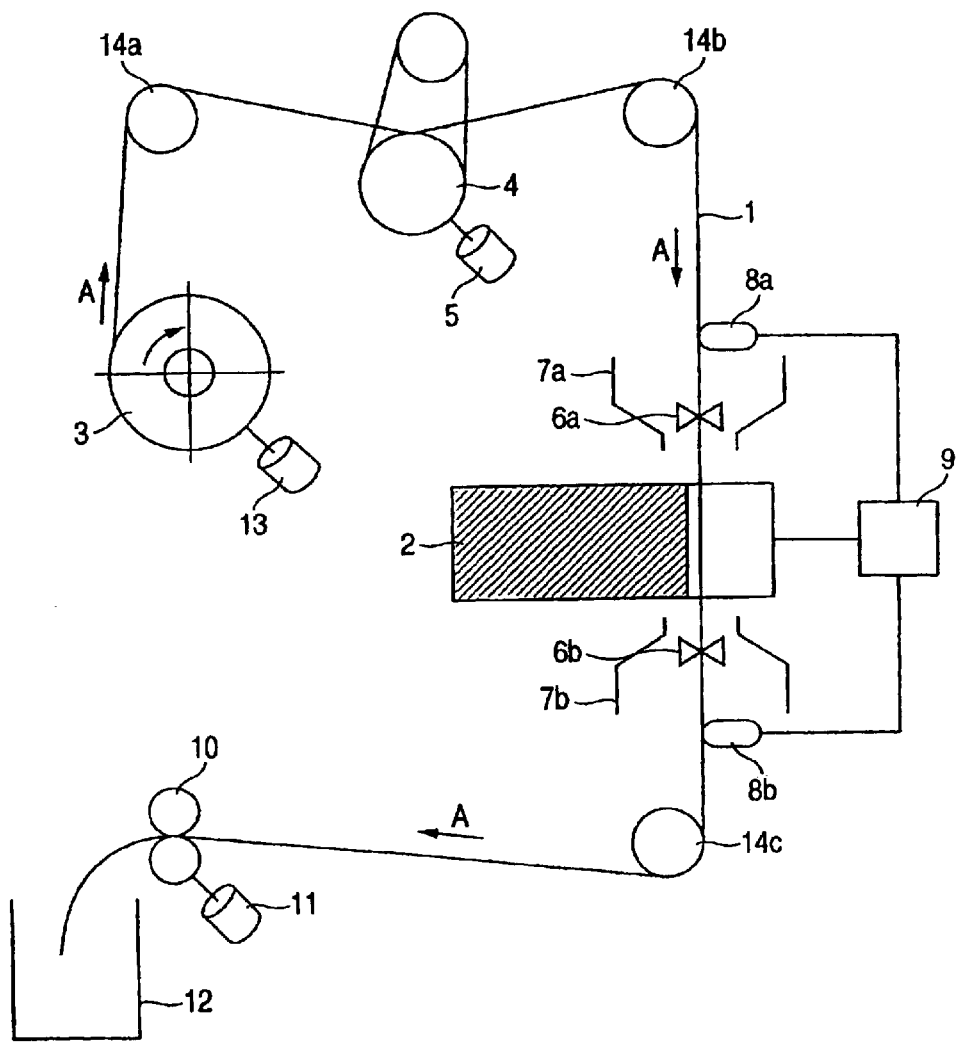
FIG. 8 is a schematic diagram illustrating a conventional wire electrical discharge machine.
Figure 9:
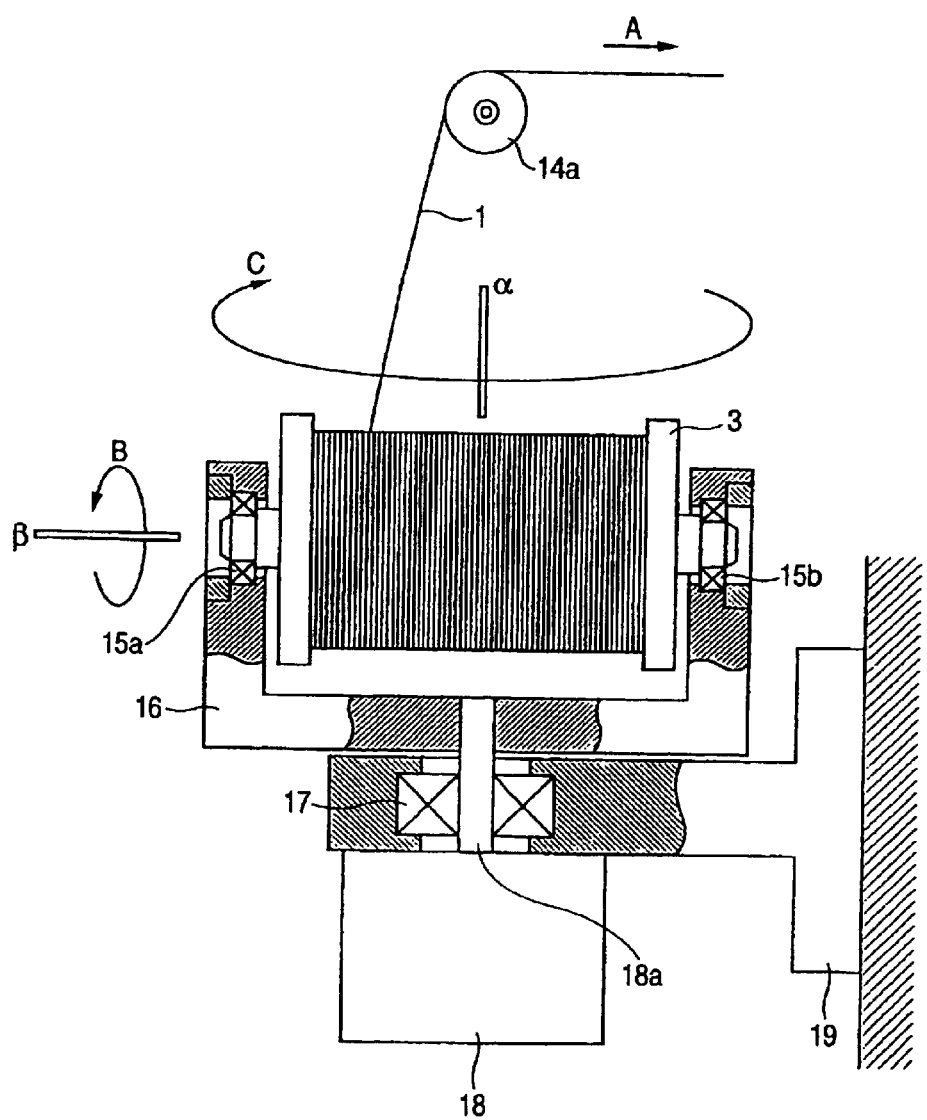
FIG. 9 is a partial cross-sectional view illustrating a wire-electrode loading mechanism of the conventional wire electrical discharge machine.

FIG. 7 is a partial cross-sectional view illustrating an example of a device for winding the wire electrode 1 in advance around the wire bobbin while rotation in the twisting direction is being continuously imparted to the wire electrode 1. In the drawing, reference numeral 1 denotes the wire electrode; 32b, a wire bobbin prior to winding; 32a, a wire bobbin shaft fixed to or formed integrally with the wire bobbin 32b; 35, a rotating arm; 36, a guide pulley; 37, a guide pulley; 38, a sliding mechanism; 39, a fixing base; and 40, a bearing. Numerals 41a and 41b denote gears, and 42 denotes a winding motor.

FIG. 7 shows an arrangement similar to that of the wire-electrode loading mechanism 20 of the first embodiment shown in FIG. 2, but the wire electrode 1 is wound around the wire bobbin 32b by feeding the wire electrode 1 in the direction of arrow G in the drawing while the rotating arm 35 is being rotated about the wire bobbin 32b (in the direction of arrow F in the drawing) by the winding motor 42 contrary to the wire-electrode loading mechanism 20. The winding around the wire bobbin 32b is effected in the state in which rotation (twist) is being imparted to the wire electrode 1 in the process of rotating the rotating arm 35 and effecting the winding. Thus it is possible to obtain the wire bobbin 32 in which the wire electrode 1 is wound in advance therearound while rotation in the twisting direction is being continuously imparted to the wire electrode 1.

In addition, it is possible to adopt an arrangement in which a driving unit for driving the guide pulley 37 in the direction of E is provided.

As the wire bobbin 32 thus fabricated is mounted on the wire electrical discharge machine, as shown in FIG. 6, and the wire electrode 1 is pulled out while rotating the wire bobbin 32 so as to effect machining, it is possible to effect the wire electrical discharge machining of the workpiece 2 while rotating the wire electrode 1 in the same way as in the first and second embodiments without using the wire-electrode rotating means for imparting rotation to the wire electrode 1. Accordingly, advantages similar to those of the first and second embodiments can be exhibited.

INDUSTRIAL APPLICABILITY

As described above, the wire electrical discharge machine in accordance with this invention is suitable for use in wire electrical discharge machining for machining a workpiece by electric discharge energy by supplying machining electric power between the wire electrode and the workpiece.

What is claimed is:

1. A wire electrical discharge machine for machining a workpiece by electric discharge energy by causing discharge to occur between a traveling wire electrode and the workpiece, characterized by comprising:

a wire bobbin with the wire electrode wound therearound;

fixing means for fixing the wire bobbin so that the wire bobbin does not rotate;

guiding means for supporting the wire electrode;

wire-electrode rotating means for supporting the guiding means and for pulling out the wire electrode from the wire bobbin and rotating the wire electrode about the wire bobbin; and driving means for driving the wire-electrode rotating means.

2. The wire electrical discharge machine according to claim 1, characterized in that the driving means is a braking motor for imparting predetermined tension to the wire electrode.

3. The wire electrical discharge machine according to claim 1, characterized by comprising: sliding means for supporting the guiding means slidably with respect to the wire-electrode rotating means, in correspondence with a winding position of the wire electrode on the wire bobbin.

4. A wire electrical discharge machine for machining a workpiece by electric discharge energy by causing discharge to occur between a traveling wire electrode and the workpiece, comprising:

a wire bobbin around which the wire electrode is wound in advance with in a state in which rotation in a twisting direction is continuously imparted to the wire electrode, and which is supported in such a manner as to be rotatable in a direction in which the wire electrode is pulled out; and a disorderliness-preventing pulley for preventing the wire electrode from becoming disorderly.

5. A wire electrical discharge machine for machining a workpiece by electric discharge energy by causing discharge to occur between a traveling wire electrode and the workpiece, comprising:

a wire bobbin with the wire electrode wound therearound;

a fixing member for fixing the wire bobbin so that the wire bobbin does not rotate; a guiding member for supporting the wire electrode;

a wire-electrode rotating member for supporting the guiding member and for pulling out the wire electrode from the wire bobbin and rotating the wire electrode about the wire bobbin; and a driving member for driving the wire-electrode rotating member.

6. The wire electrical discharge machine according to claim 5, wherein the driving member includes a braking motor for imparting predetermined tension to the wire electrode.

7. The wire electrical discharge machine according to claim 5, further comprising a sliding member for supporting the guiding member slidably with respect to the wire-electrode rotating member, in correspondence with a winding position of the wire electrode on the wire bobbin.

* * * * *